Aug. 2, 1938.  P. G. PALMGREN  2,125,648
ROLLER BEARING
Filed Aug. 12, 1936  2 Sheets-Sheet 1
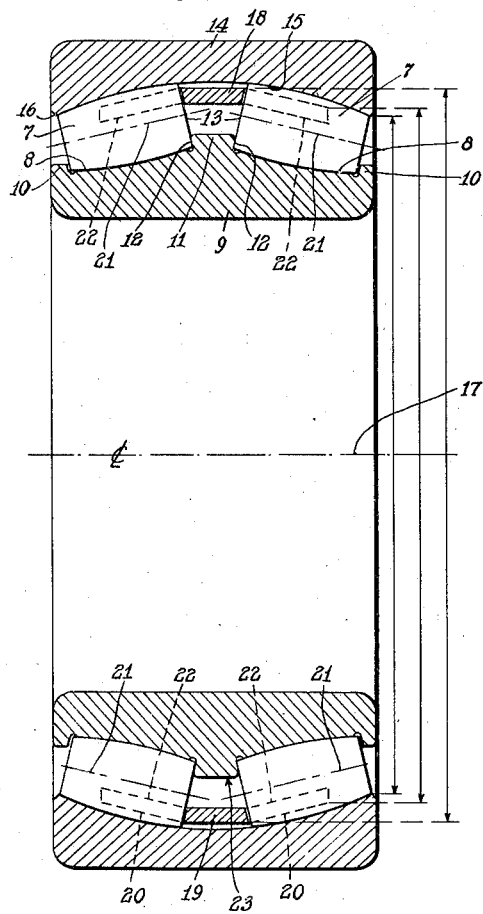
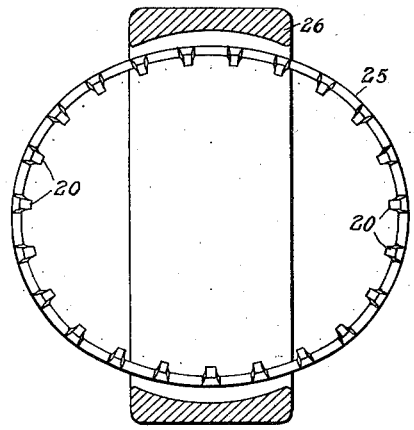
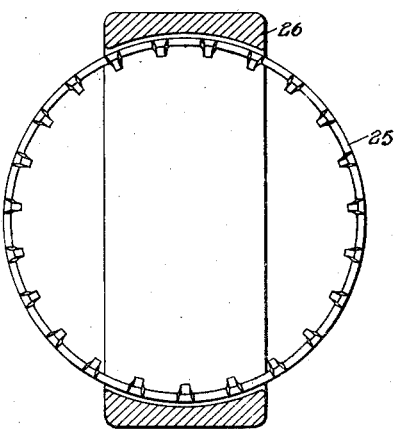
INVENTOR.
Per Gunnar Palmgren
BY
his ATTORNEY.

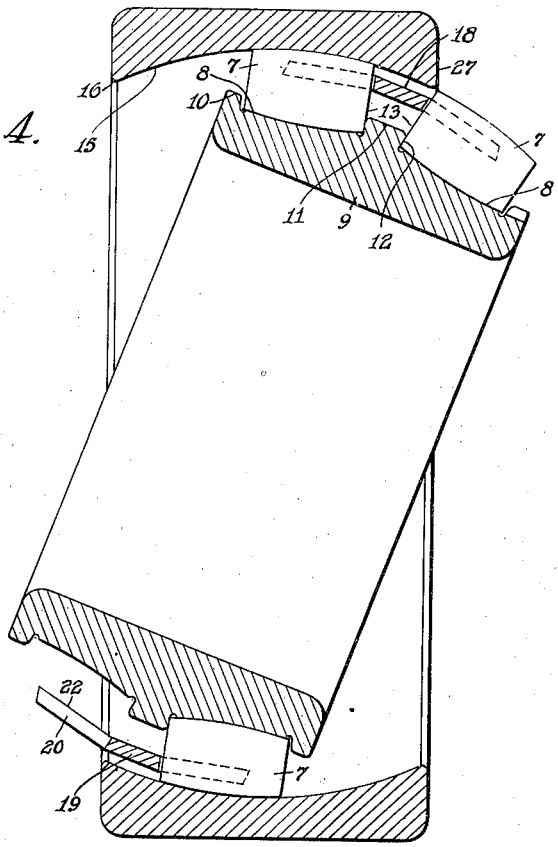

Patented Aug. 2, 1938

2,125,648

UNITED STATES PATENT OFFICE 2,125,648

ROLLER BEARING

Per Gunnar Palmgren, Philadelphia, Pa., assignor to S K F Industries, Inc., Philadelphia, Pa., a corporation of Delaware Application August 12, 1936, Serial No. 95,495

4 Claims. (Cl. 308—214)

This invention relates to roller bearings and more particularly to bearings in which both sides of the outer race ring are provided with flanges or inwardly projecting parts which are of less distance from the axis of the bearing than is the desired outer perimeter of the cage.

Another characteristic of the bearing to which this invention relates is that the rollers are slim in comparison with rollers of the conventional type to which this improvement pertains.

A further object of the invention in a more specific form relates to a two-row self aligning bearing in which there is a substantially continuous hollow spherical raceway surface formed within the outer race ring, this surface being symmetrically disposed, and upon which surface run two rows or sets of barrel shaped rollers, the rollers being slim in comparison with the present existing type most generally in use.

A further object of the invention is to provide a cage for spacing the rollers in the sets apart, the space limitations making it impracticable if not impossible to employ with these slim rollers a cage such as is used with rollers which are of larger diameter in relation to their length than are those to which my invention is peculiarly related.

Another object of the invention is to provide a cage in this type of bearing, the entire outer perimeter of which is of greater diameter perpendicular to the axis of the bearing than are the sides of the ring at the terminations of the hollow sphere.

Another object of the invention is to provide a spherical roller bearing with slim rollers and to form a cage for such rollers which lies outwardly of the pitch circle of the set of rollers, the outer perimeter of the cage being of larger diameter than are the sides of the outer race ring.

In the drawings accompanying this specification and forming part of my application, one practicable embodiment of my improved roller bearing is illustrated together with some alternative modes of assembling the parts of the bearing. In which drawings:

Figure 1 is an axial section of a bearing made in accordance with my invention.

Figure 2 shows an axial section of the outer race ring of the bearing and an edge view of the cage during the time the cage is inserted into this outer ring by means of elastically deforming one or the other or both of these parts.

Figure 3 is a view of the same parts shown in Figure 2 after the cage has been inserted within the race ring and the parts have been permitted to assume their normal form, and Figure 4 is a diagrammatic illustration showing the way the rollers are inserted into the pockets in the cage.

In cases where it has been found undesirable or impractical on account of space limitations to use the existing form of spherical roller bearing; that is where the space limitation refers to the outer diameter of the outer ring and in which the axial space limitations were not so restricted; it has been found that a very satisfactory bearing may be produced to meet this requirement by reducing the diameters of the rollers from the conventional size and making them longer.

By reference to Figure 1, it will be seen that there are two rows of long slim barrel shaped rollers indicated by the reference character 7, each of these sets of rollers traveling in a raceway 8, formed on the outer surface of the inner race ring 9. In this illustration flanges 10 are provided for the outer ends of the rollers. The medial portion of the inner ring is shown thickened at 11. A flange being there formed having guiding side faces 12 for the inner ends 13 of the rollers. The outer race ring 14 is shown formed on its inner surfaces as the equatorial zone of a hollow sphere 15, this being one of those forms of bearing which is bilaterally symmetrical. It will be noted that the outer edge of this spherical surface, for instance at about the region 16 is of less diameter in a direction perpendicular to the axis of the bearing than is any part of the outer perimeter of the cage 18. The cage in Figures 1, 2 and 3 is a one piece structure embodying a central ring 19 carrying a series of laterally directed arms 20, these arms preferably are inclined toward the axis of the bearing, and in the illustration occupy planes substantially parallel to the axes 21 of the rollers. The line 21 in Figure 1 may also be regarded as representing the conical surface upon which the pitch plane or cone of the rollers lies.

It will be noted that the inner surfaces 22 of the arms 20 of the cage lie well outside of the pitch cone. Most of the inside surface of the cage is of greater diameter than is the diameter of the part 16 above mentioned.

The entire outer perimeter of the cage is shown as being of larger diameter than is the diameter of the sides or lands of the interior of the bearing ring. For purposes of further identification the reference character 23 has been applied to the outer perimeter of the guide flange or separating flange which is located between the inner ends of the rollers.

Upon inserting a cage of known structure between the inner and outer rings of the bearing, it will have to clear the annular edge 16 and the annular surface 23.

According to known forms of construction it has been the custom to have the cage rather rigid and in assembling the bearing to place the cage in its approximate position outside the inner race ring, introduce the rollers into the pockets formed between the side arms and in the race grooves in the inner ring, leaving one or two rollers out of each side of the cage at diametrically opposite sides. The inner race, the cage and rollers, is then presented to the outer race in about the position shown in Figure 3. The perimeter of the larger diameter portion of the cage being less than the diameter of the sides or lands of the outer bearing ring, it is quite easy to make this insertion after which the inner bearing ring is turned into the plane of the outer bearing ring, the omitted rollers may then be inserted.

It would be impossible to assemble a bearing having rollers of the form illustrated in Figure 1 and having a cage of the ordinary construction as above outlined.

According to my invention the cage is formed of somewhat lighter construction than that heretofore used and is preferably capable of elastic deformation. In practice I have found it desirable to form the cage out of steel and subject it to heat treatment giving it a spring temper. The bearing rings are generally made out of steel which, while not given what is called a spring temper, yet are capable of considerable elastic deformation. One manner of assembling a one piece cage according to my present invention is to deform the cage 25 as in Figure 2. After the cage has been inserted into the one piece outer bearing ring 26, it is permitted to assume its natural position. This is shown in Figure 3.

Instead of deforming the cage 25 the ring 26 may be deformed. In some cases it may be found more desirable to deform the ring and the cage at the same time. This latter will of course, require less deformation of each part.

After the cage has been inserted within the bearing ring and moved into its proper plane in relation to such ring, the inner bearing ring is passed to its proper position within the cage. The cage and inner ring are then turned to about the position illustrated in Figure 4 and the rollers are inserted in the race grooves in the inner ring and between the arms or fingers of the cage.

I am aware of the fact that in assembling annular bodies of various kinds one within another resort has been had to their elastic deformation. My belief however, is that no one heretofore has assembled within a bearing outer race such as is herein illustrated, a cage having a body portion carrying laterally extending arms or prongs for lying between the rollers and spacing them apart and preferably retaining them within the raceway of the inner bearing ring upon alignment of one ring relative to the other.

Having thus described my invention, I claim and desire to secure by Letters Patent:

1. In a roller bearing, the combination with an outer ring having formed within it a continuous hollow spherical raceway surface, such surface being symmetrically disposed, of two rows of slim rollers for running upon such spherical raceway, an inner ring having raceways for the rows of rollers, and a cage having arms extending laterally from both sides, lying between the rollers, spacing them apart and retaining them within the respective raceways of the inner ring, the outer perimeter of the cage being of greater diameter than is the diameter at the sides of the spherical raceway.

2. In a roller bearing, the combination with a race ring having formed within it a hollow spherical raceway surface, such surface being symmetrically disposed, of two rows of slim rollers generated with faces to conform to the spherical raceway, and a cage for the rollers, the entire outer perimeter of which is of greater diameter perpendicular to the axis of the bearing than are the sides of the ring at the termination of the hollow sphere.

3. In a roller bearing, the combination with a race ring having formed within it a hollow spherical raceway surface, of two sets of slim rollers formed to roll upon such hollow spherical surface and a cage for such rollers lying outwardly of the pitch circle of the set of rollers, the outer perimeter of the cage being of larger diameter than is the diameter of either side of said spherical surface perpendicular to the axis of the bearing.

4. In a roller bearing, the combination with an outer ring having formed within it a continuous hollow spherical raceway surface, of two rows of slim rollers for running upon such spherical raceway, an inner ring having raceways for the rows of rollers and a cage having arms extending laterally from both sides, lying between the rollers, spacing them apart and retaining them within the respective raceways of the inner ring, the outer perimeter of the cage being of greater diameter than is the diameter of either side of the said hollow spherical raceway surface.

PER GUNNAR PALMGREN.